US012365443B2

(12) United States Patent
Yakobov et al.

(10) Patent No.: US 12,365,443 B2
(45) Date of Patent: *Jul. 22, 2025

(54) APPARATUS AND METHODS FOR AIRCRAFT PROPELLER CONTROL

(71) Applicant: PRATT & WHITNEY CANADA CORP., Longueuil (CA)

(72) Inventors: Ella Yakobov, Montreal (CA); James Robert Jarvo, Saint Bruno de Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 718 days.

This patent is subject to a terminal disclaimer.

(21) Appl. No.: 17/682,349

(22) Filed: Feb. 28, 2022

(65) Prior Publication Data

US 2022/0177155 A1  Jun. 9, 2022

Related U.S. Application Data

(63) Continuation of application No. 16/664,122, filed on Oct. 25, 2019, now Pat. No. 11,292,607, which is a
(Continued)

(51) Int. Cl.
*B64D 45/00* (2006.01)
*B64C 11/30* (2006.01)
*B64D 35/02* (2006.01)

(52) U.S. Cl.
CPC .......... *B64D 45/0005* (2013.01); *B64C 11/30* (2013.01); *B64C 11/301* (2013.01); *B64D 35/02* (2013.01)

(58) Field of Classification Search
CPC ....... B64C 11/301; B64C 11/30; B64C 11/50; G05D 1/04–0688; G05D 1/0808–0866;
(Continued)

(56) References Cited

U.S. PATENT DOCUMENTS 4,948,337 A   8/1990  Martin
5,174,718 A * 12/1992  Lampeter ................ B64C 11/38
                                                      416/157 R
(Continued)

FOREIGN PATENT DOCUMENTS

EP    0353076      7/1989
EP    2876046 A1   5/2015
(Continued)

OTHER PUBLICATIONS

FR-3075353-B1 machine translation (Year: 2020).*
(Continued)

*Primary Examiner* — Fadey S. Jabr
*Assistant Examiner* — Mark Robert Heim
(74) *Attorney, Agent, or Firm* — Norton Rose Fulbright Canada LLP

(57) ABSTRACT

An aircraft propeller control system for an aircraft propeller with adjustable blade angle has a blade angle feedback ring and a sensor, one of which is mounted for rotation with the propeller. The blade angle feedback ring moves longitudinally along with adjustment of the blade angle and has position markers circumferentially spaced apart at distances that vary along a longitudinal axis. The sensor is positioned adjacent the feedback ring for producing signals indicative of passage of the position markers. Intervals between signals are indicative of circumferential distances between position markers. A controller measures longitudinal position of the feedback ring based on the intervals and is configured to produce a warning signal if the longitudinal position is outside a first threshold range.

16 Claims, 14 Drawing Sheets

Related U.S. Application Data continuation of application No. 15/239,784, filed on Aug. 17, 2016, now Pat. No. 10,486,827.

(58) Field of Classification Search
CPC ... G05D 1/10–1064; G05D 1/439–498; G05D 1/86; B64D 45/0005; B64D 35/02
See application file for complete search history.

(56) References Cited

U.S. PATENT DOCUMENTS

| | | | |
|---|---|---|---|
| 5,209,640 | A | 5/1993 | Moriya |
| 5,211,539 | A * | 5/1993 | McCarty ............... B64C 11/301 |
| | | | 416/61 |
| 5,284,418 | A | 2/1994 | Moriya |
| 5,299,911 | A | 4/1994 | Moriya |
| 5,865,599 | A * | 2/1999 | Pruden .................... B64C 11/30 |
| | | | 416/61 |
| 5,997,250 | A | 12/1999 | Carter |
| 6,004,098 | A | 12/1999 | Chevallier |
| 6,224,021 | B1 | 5/2001 | Tanaka |
| 7,281,482 | B1 | 10/2007 | Beauchamp |
| 8,186,629 | B2 | 5/2012 | Queiras |
| 8,262,352 | B2 | 9/2012 | Gainford |
| 8,465,257 | B1 | 6/2013 | Noble |
| 8,549,833 | B2 | 10/2013 | Hyde |
| 8,689,538 | B2 | 4/2014 | Sankrithi |
| 9,216,820 | B2 | 12/2015 | Eglin |
| 9,272,778 | B2 | 3/2016 | Eglin |
| 9,459,609 | B2 * | 10/2016 | Koizumi ............. G05B 23/0283 |
| 10,486,827 | B2 * | 11/2019 | Yakobov ................ B64C 11/50 |
| 10,793,255 | B2 * | 10/2020 | Miszkiewicz ............ F02C 3/04 |
| 11,292,607 | B2 * | 4/2022 | Yakobov ............... B64D 35/02 |
| 2004/0018914 | A1 | 1/2004 | Stolfus |
| 2005/0193968 | A1 * | 9/2005 | Nohara .................... F01L 1/267 |
| | | | 123/90.15 |
| 2007/0113629 | A1 * | 5/2007 | Lohmiller .......... G05B 23/0275 |
| | | | 73/85 |
| 2009/0071425 | A1 * | 3/2009 | Inoue ..................... F01L 1/352 |
| | | | 123/90.15 |
| 2009/0109039 | A1 * | 4/2009 | Kellzi ..................... B60R 25/04 |
| | | | 340/584 |
| 2009/0287390 | A1 * | 11/2009 | Mizuno ..................... G01D 1/12 |
| | | | 73/114.54 |
| 2010/0068056 | A1 | 3/2010 | Gainford |
| 2010/0095932 | A1 * | 4/2010 | Nakauchi ................ F02P 1/086 |
| | | | 123/406.18 |
| 2010/0262320 | A1 * | 10/2010 | Koizumi ............ B64D 45/0005 |
| | | | 701/14 |
| 2014/0019081 | A1 * | 1/2014 | Suzuki .................. G01M 15/02 |
| | | | 702/113 |
| 2014/0147245 | A1 * | 5/2014 | Payne ..................... F01D 17/14 |
| | | | 415/13 |
| 2014/0290624 | A1 * | 10/2014 | Uematsu ............. F02D 41/3005 |
| | | | 123/478 |
| 2015/0139798 | A1 * | 5/2015 | Duke ...................... G01P 3/487 |
| | | | 416/61 |
| 2017/0283046 | A1 * | 10/2017 | Egolf ...................... B64C 27/14 |
| 2018/0050816 | A1 * | 2/2018 | Yakobov ................ B64D 35/02 |
| 2018/0079522 | A1 * | 3/2018 | El Haloui ............. B64D 45/00 |
| 2018/0327112 | A1 * | 11/2018 | Huth ...................... B64D 45/00 |
| 2020/0017234 | A1 * | 1/2020 | Marone .................. B64C 11/06 |

FOREIGN PATENT DOCUMENTS

| | | | | |
|---|---|---|---|---|
| FR | 3075353 | B1 * | 5/2020 | ............ B64C 11/30 |
| GB | 2346701 | A | 12/1999 | |
| GB | 2465575 | A * | 5/2010 | .......... B64C 11/306 |
| GB | 2548085 | B * | 12/2019 | ............... B63H 3/00 |

OTHER PUBLICATIONS

Jones et al., Preliminary Design of Sliding Mode Controller for Angular Positional Tracking of an Aircraft, Proceedings of the 7th Asian Control Conference, Aug. 27-29, 2009, pp. 483-488, Hong Kong, China.

European Patent Office, Communication of extended European search report re. European patent application No. 17186725.2, Dec. 7, 2017.

European Patent Office, Communication of extended European search report re. European patent application No. 21203536.4, Feb. 21, 2022.

* cited by examiner

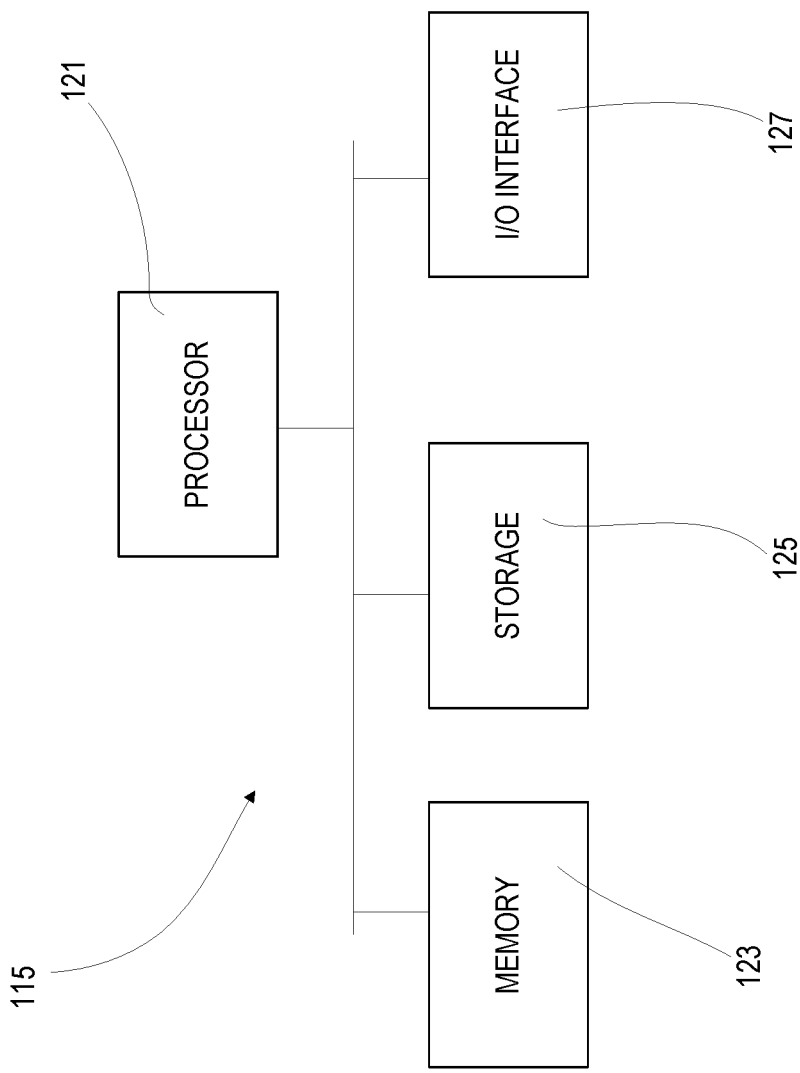

APPARATUS AND METHODS FOR AIRCRAFT PROPELLER CONTROL

CROSS REFERENCE TO RELATED APPLICATIONS AND CLAIM OF PRIORITY

The present application is a continuation of U.S. patent application Ser. No. 16/664,122 filed on Oct. 25, 2019 which is a continuation of U.S. patent application Ser. No. 15/239,784, filed on Aug. 17, 2016, and issued as U.S. patent Ser. No. 10/486,827, the entire contents of which are hereby incorporated by reference.

TECHNICAL FIELD

The disclosure relates generally to propeller control systems for gas turbine engines and, more particularly, to systems and methods for monitoring operational conditions of propellers.

BACKGROUND

Some aircraft engines have propellers with variable pitch, referred to as propeller blade (or beta) angle. In such engines, accurate control of the beta angle is important for proper engine operation. For example, control of the beta angle may allow the blade angle to be controlled according to the desired engine power set-point. Accurate measure of the blade angle also ensures that the propeller is not inadvertently commanded to transition into low or reverse beta angles, which would cause a potentially serious failure condition for the aircraft.

A propeller may form part of an assembly having numerous components. For example, a propeller may be mounted to a propeller shaft, which may itself be received in a gear box. Further components may also be present. Each component of the propeller assembly may be manufactured to a specific nominal size and tolerance. The dimensional configuration of a particular propeller assembly may be influenced by the tolerance stack-up. That is, the propeller position may depend on whether parts in the assembly are over or under their nominal sizes, and by how much. Accurate control of the propeller and propeller assembly may depend on the tolerance stack-up. Moreover, safe and efficient operation may require that the tolerance stack-up is within specification.

SUMMARY

A propeller control system for an aircraft propeller is described, rotatable about a longitudinal axis and having an adjustable blade angle. The control system comprises: a blade angle feedback ring coupled to the propeller to rotate with the propeller and to move along the longitudinal axis along with adjustment of the blade angle, the blade angle feedback ring comprising a plurality of position markers spaced around its circumference such that a circumferential distance between at least some adjacent ones of the position markers varies along the longitudinal axis; a sensor positioned adjacent the blade angle feedback ring for producing signals indicative of passage of the position markers, such that an interval between ones of the signals is indicative of a circumferential distance between adjacent ones of the position markers; and a controller in communication with the sensor to measure a longitudinal position of the feedback ring based on an interval between consecutive ones of the signal, the controller configured to produce a warning signal if the longitudinal position is outside a first threshold range.

A method of monitoring an operating condition of an aircraft propeller is described, rotatable about a longitudinal axis and having an adjustable blade angle. The method comprises: measuring a distance between position markers on a feedback device mounted for rotation with the propeller, the position markers diverging in a longitudinal direction and the feedback device mounted for longitudinal movement along with adjustment of the blade angle, wherein the measured distance is representative of a longitudinal position of the feedback device; comparing a value representative of the longitudinal position with at least one reference value; and outputting a signal representative of the longitudinal position.

An aircraft engine is described, the engine comprises: a propeller rotatable about a longitudinal axis, the propeller having blades with adjustable blade angle; a feedback ring mounted for rotation with the propeller, and for movement along the longitudinal axis along with adjustment of the blade angle, the feedback ring comprising a plurality of position markers spaced around its circumference such that a circumferential distance between at least some adjacent ones of the position markers varies along the longitudinal axis; a propeller shaft extending from a gearbox for driving the propeller; a sensor fixedly mounted to the gearbox proximate the feedback ring, the sensor operable to produce a signal when passed by a feedback marker, such that an interval between ones of the signals is indicative of a circumferential distance between adjacent ones of the position markers; and a controller in communication with the sensor to measure an interval between consecutive ones of the signal on engine startup and compute a corresponding longitudinal position of the feedback ring, the controller configured to produce a warning signal if the longitudinal position is outside a threshold range.

BRIEF DESCRIPTION OF DRAWINGS

In the drawings, which illustrate example embodiments:

FIG. 4 is a block diagram of a controller;

DETAILED DESCRIPTION

Figure 1:
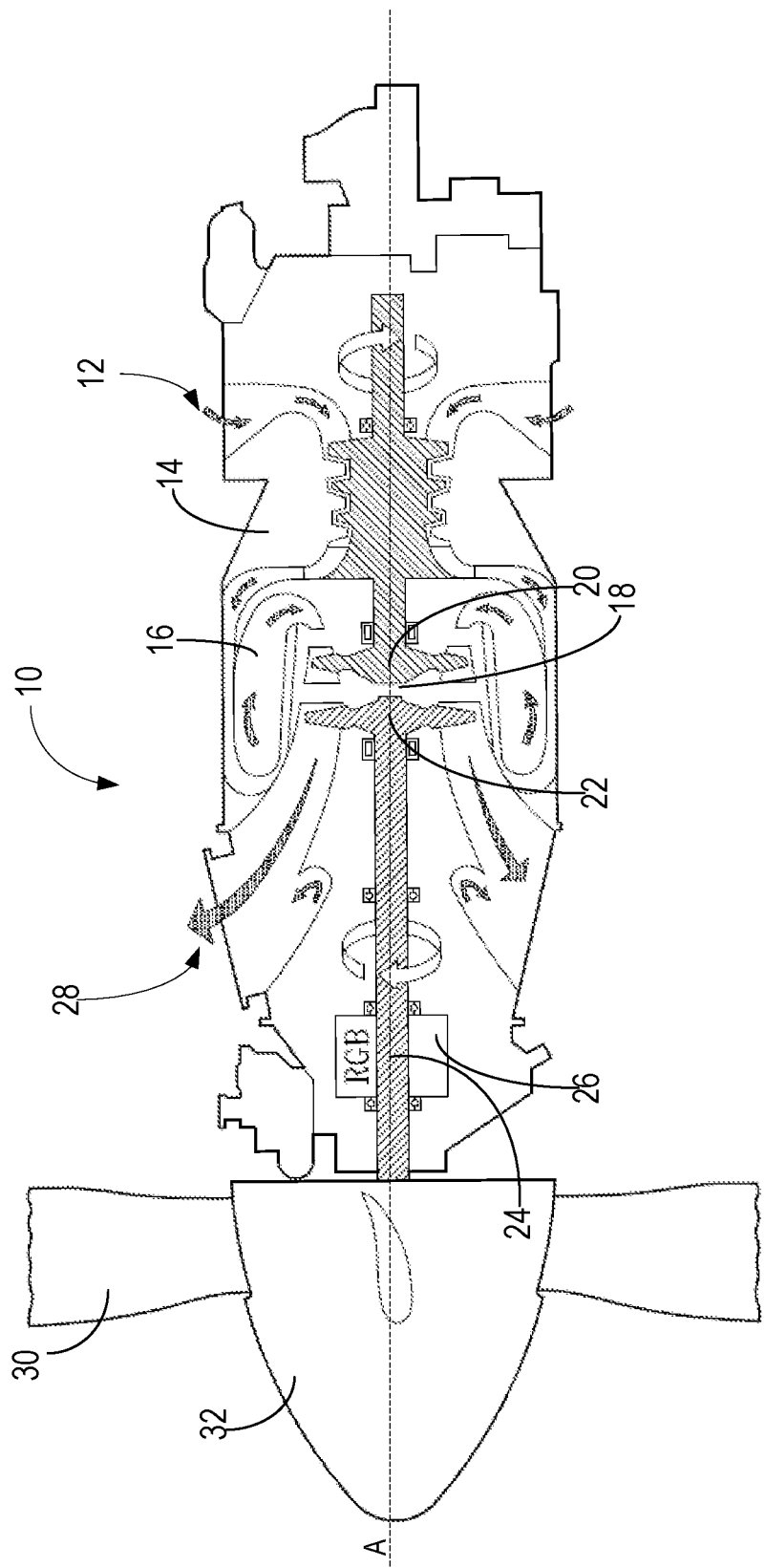
FIG. 1 is a schematic cross-sectional view of a gas turbine engine.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatingly drives a rotor shaft 24 about a propeller shaft axis A through a reduction gearbox 26. Hot gases may then be evacuated through exhaust stubs 28. The gas generator (not shown) of the engine 10 illustratively comprises the compressor section 14, the combustor 16, and the turbine section 18. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter. The rotor 30 may comprise a plurality of circumferentially-arranged blades (not shown) connected to a hub (not shown) by any suitable means and extending radially therefrom. The blades are also each rotatable about their own radial axes through a plurality of blade angles, which can be changed to achieve modes of operation, such as feather, full reverse, and forward thrust.

Figure 2:
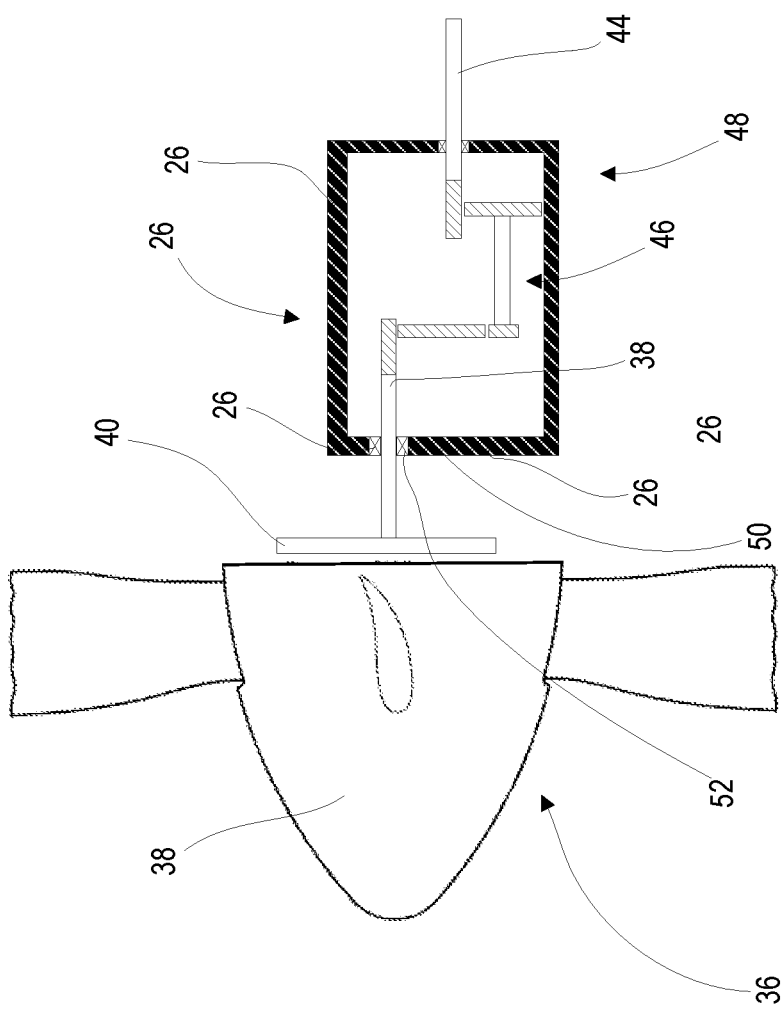
FIG. 2 is a schematic cross-sectional diagram of a propeller assembly with a reduction gearbox.

As depicted in FIG. 2, the rotor 30 is part of a propeller assembly 36. Rotor 30 is mounted to a propeller shaft 38 with a mounting flange 40. The propeller shaft 38 is received in reduction gear box 26. Reduction gear box 26 receives power from an input shaft 44 which rotates and drives propeller shaft 38 by way of a gear train 46. Propeller shaft 38 and rotor 30 rotate around a longitudinal propeller axis A. As used herein, references to the longitudinal direction refer to a direction parallel to longitudinal propeller axis A.

Gear train 46 may reduce angular velocity such that rotor 30 turns at a lower speed than input shaft 44. As depicted, gear train 46 includes two sets of reduction gears. However, gear train 46 could have any number of reduction gears. Alternatively or additionally, gear train 46 may include one or more planetary gear sets.

Reduction gear box 26 has a housing 48 with a front wall 50. Propeller shaft 38 is received through an opening in front wall 50 and carried by a bearing 52 which fixes the longitudinal position of propeller shaft 38 relative to housing 48.

Figure 3:
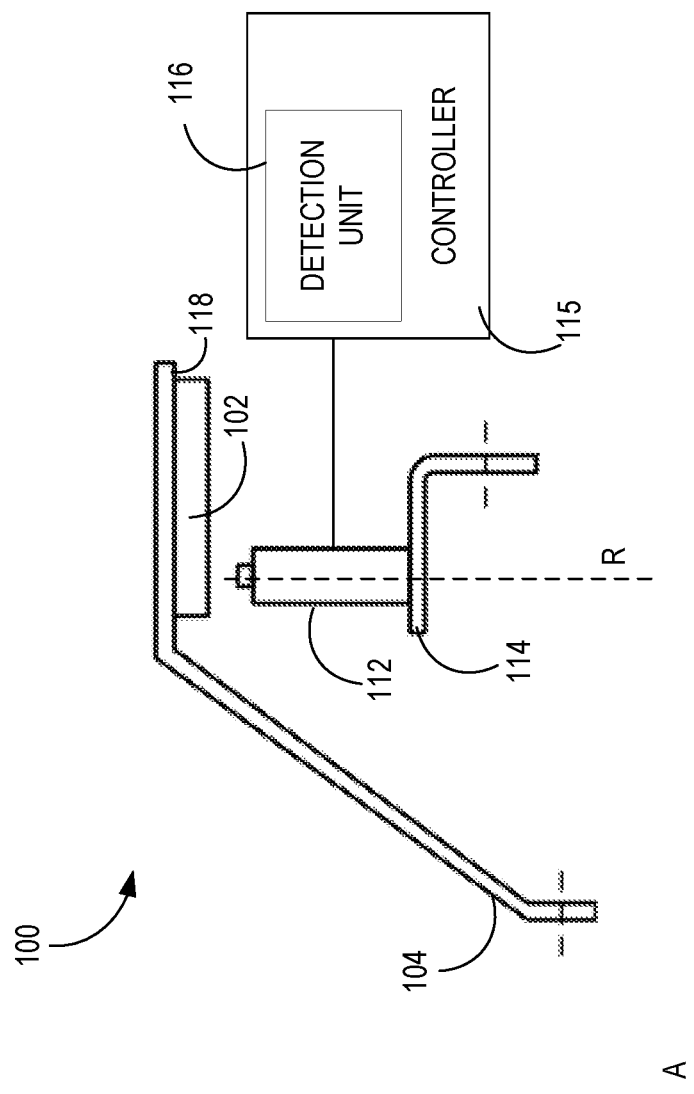
FIG. 3 is a schematic diagram of a system for electronic beta feedback detection, in accordance with an illustrative embodiment.

Referring to FIG. 3, an electronic beta feedback system 100 will now be described. The system 100 provides for accurate detection and measurement of propeller blade angle on propeller systems, such as the engine 10 of FIG. 1. The system 100 may interface to existing mechanical interfaces of typical propeller systems to provide a digital detection for electronic determination of the propeller blade angle.

The system 100 illustratively comprises an annular member 104 and one or more sensors 112 positioned proximate the annular member 104. Annular member 104 (referred to herein as a propeller beta feedback ring) has a plurality of position markers 102 provided thereon for detection by sensor 112. One of beta feedback ring 104 and sensor 112 may be mounted for rotation with propeller 30 and to move axially with adjustment of the blade angle. The other of beta feedback ring 104 and sensor 112 may be fixedly mounted, e.g. to housing 48 of reduction gearbox 26.

Figure 5A:
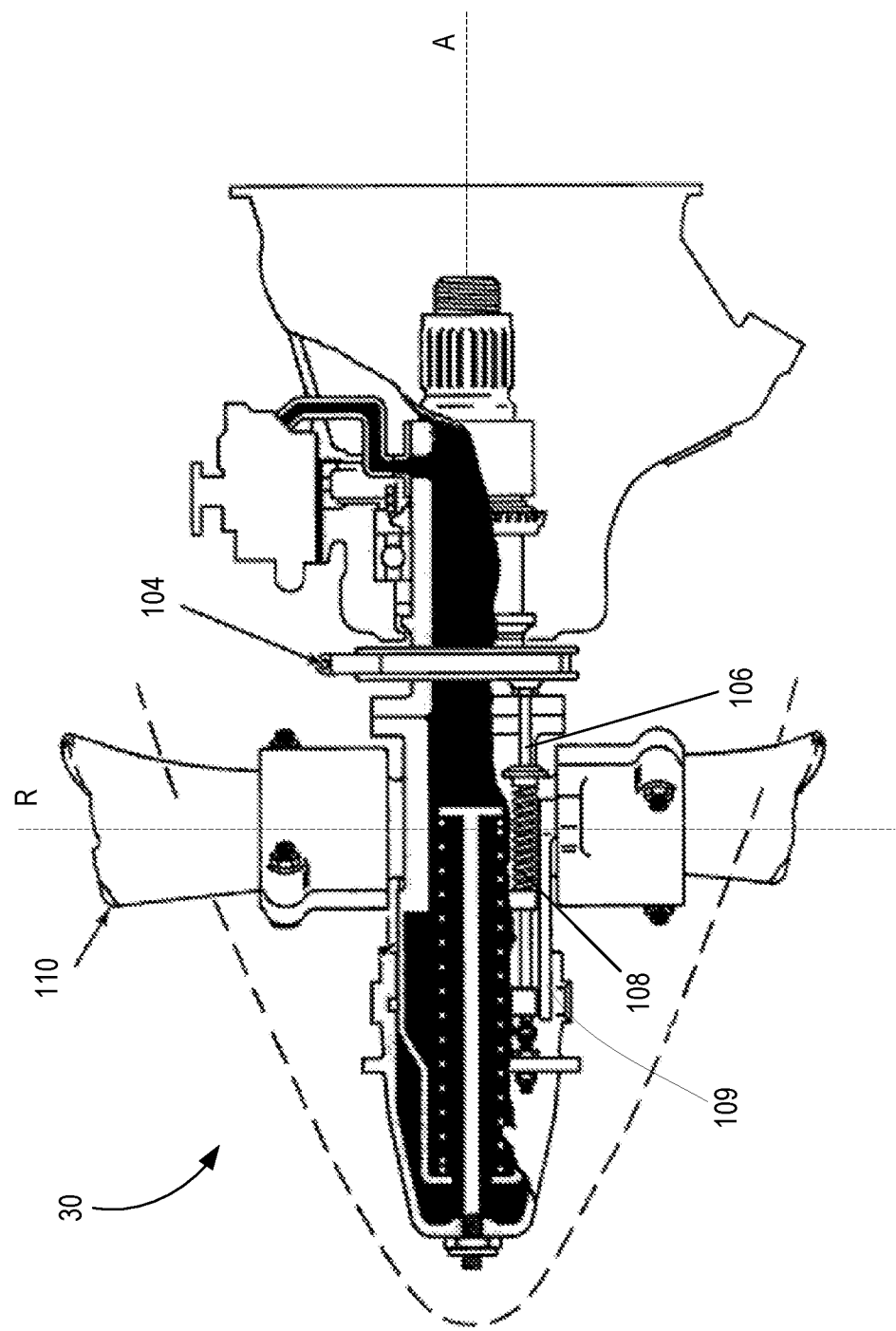
FIG. 5A is a schematic diagram of the propeller of FIG. 1 showing the feedback ring of FIG. 2, in accordance with an illustrative embodiment.

As depicted in FIG. 5A, the beta feedback ring 104 is supported for rotation with the propeller 30, which rotates about the longitudinal axis A. The beta feedback ring 104 is also supported for longitudinal sliding movement along the axis A, e.g. by support members, such as a series of circumferentially spaced beta feedback rods 106 that extend along the longitudinal axis A. A compression spring 108 surrounds an end portion of each rod 106.

As depicted in FIG. 5A, the propeller 30 comprises a plurality of angularly arranged blades 110 each of which is rotatable about a radially-extending axis R through a plurality of adjustable blade angles, the blade angle being the angle between the chord line (i.e. a line drawn between the leading and trailing edges of the blade) of the propeller blade section and a plane perpendicular to the axis of propeller rotation. The propeller 30 may be a reversing propeller 30 having a plurality of modes of operation, such as feather, full reverse, and forward thrust. In some modes of operations, such as feather, the blade angle is positive. The propeller 30 may be operated in a reverse mode where the blade angle is negative.

Feedback ring 104 is mounted to move along the longitudinal direction as the beta angle of the propeller blades is adjusted. Specifically, adjustment of the beta angle causes a corresponding axial movement of the rods 106, and accordingly of the feedback ring 104, parallel to axis A. Conversely, adjustment of the beta angle in a first direction causes feedback ring 104 to move forwardly, and adjustment of the beta angle in the opposite direction causes feedback ring 104 to move rearwardly. In an example, rods 106 and feedback ring 104 are moved to a maximally-forward position when blades 110 are at their smallest (or most negative) beta angle, and are moved to a maximally-rearward position when blades 110 are at their largest (or most positive) beta angle. As will be apparent, in other embodiments, this orientation may be reversed.

Figure 5B:
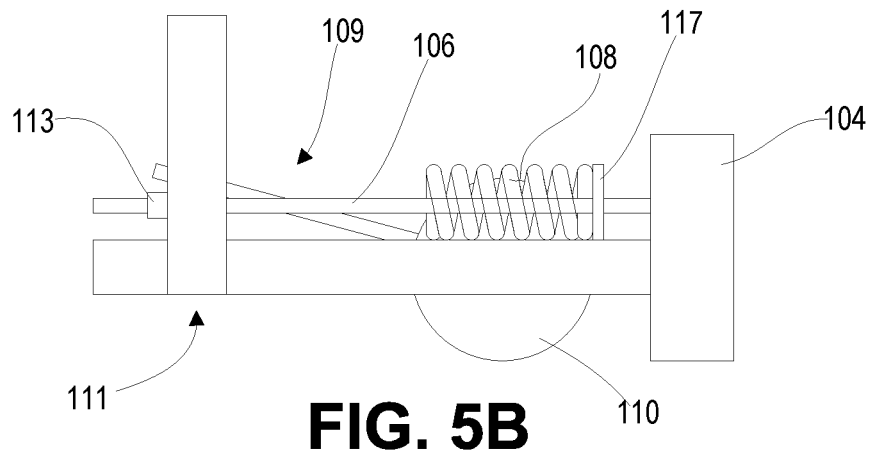
FIGS. 5B-5D are schematic diagrams showing adjustment of propeller blade angle.
Figure 5C:
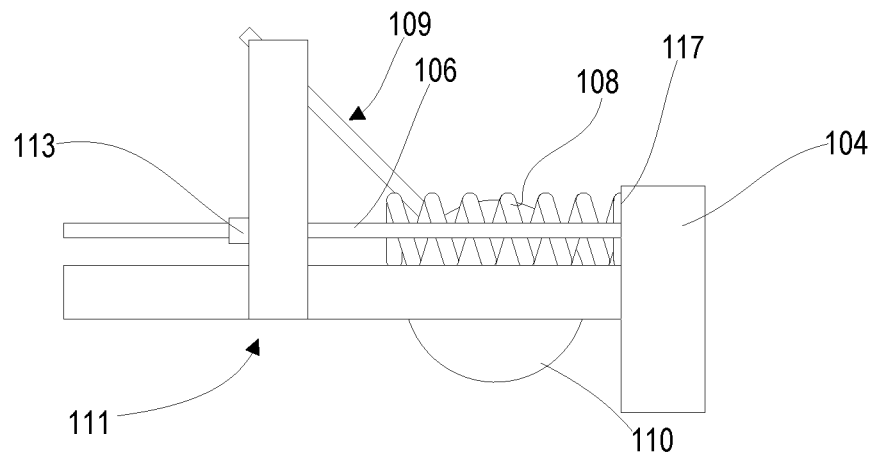
Figure 5D:
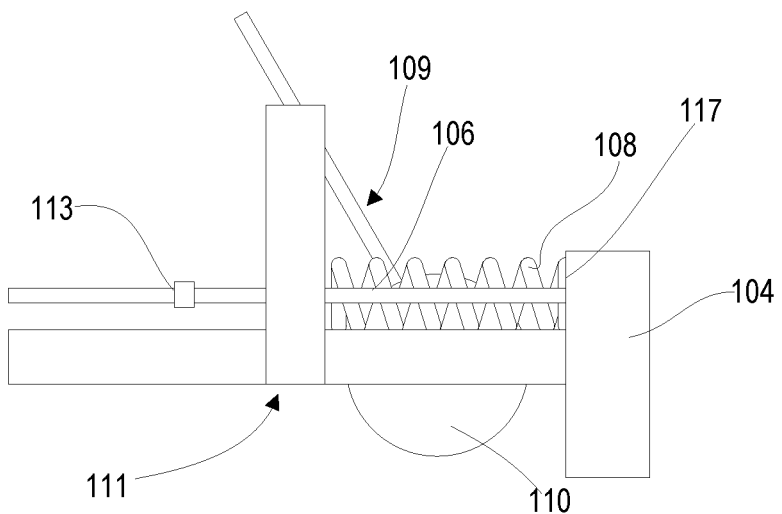

In an example, actuators 109 engage with a piston assembly 111 for adjusting the beta angle of the blades. Specifically, piston assembly 111 moves back and forth along the longitudinal axis and cause rotation of blades 110 by sliding engagement with actuators 109. In the depicted embodiment, forward motion of piston assembly 111 reduces the beta angle of blades 110 and rearward motion increases the beta angle. However, in other embodiments, this may be reversed. Piston assembly 111 also engages rods 106 as it adjusts the beta angle. During a portion of the forward motion of piston assembly 111, it bears against a stop 113 mounted to rod 106, pulling rod 106 and feedback ring 104 forwardly and compressing spring 108 as shown in FIG. 5B. As piston assembly 111 moves rearwardly, spring 108 urges rod 106 and feedback wheel 104 rearwardly as shown in FIG. 5C. In the depicted embodiment, feedback wheel 104 reaches its maximally-rearward position before piston assembly 111 reaches its maximally-rearward position. After feedback ring 104 reaches is maximally-rearward position, piston assembly 111 moves out of contact with stop 103 as shown in FIG. 5D, after which further rearward movement of piston assembly 111 does not cause movement of feedback ring 104.

Other suitable configurations for adjusting beta angle and causing corresponding longitudinal movement of feedback wheel 104 will be apparent to skilled persons.

The feedback ring 104 is illustratively used to provide blade (or beta) angle position feedback. During rotation of the propeller (reference 30 in FIG. 5A), the feedback ring and plurality of position markers 102 rotate about longitudinal axis A and their passage is detected by at least one sensor 112 provided in a fixed relationship relative to the rotating propeller components. The sensor 112 may be any sensor (e.g. a speed transducer) configured to continuously detect passage of the position markers 102 during rotation of the propeller 30. In one embodiment, the sensor 112 is an electrically robust and environmentally sealed non-contact sensor suited for harsh environments and offering superior reliability. The sensor 112 may be any suitable inductive sensor having a varying reluctance or a Hall effect. In one embodiment, the sensor 112 is implemented as a transducer comprising a coil wound around a permanent magnet (not shown). The position markers 102A, 102B, 102C may then be made of a magnetically conductive material, e.g. a ferrous metal, to enable the sensor 112 to detect the passage thereof.

FIG. 3 depicts a side view of a portion of beta feedback ring 104 and sensor 112. The sensor 112 is illustratively mounted to a flange 114 of housing 48 of reduction gearbox 26 so as to be positioned adjacent the plurality of position markers 102. In particular, the sensor 112 is illustratively secured to the propeller 30 so as to extend away from the flange 114 (and towards the position markers 102) along a radial direction, identified in FIG. 3 as direction R. Sensor 112 and flange 114 may be fixedly mounted. In one embodiment, a single sensor 112 is mounted in close proximity to the beta feedback ring 104 and the position markers 102. In another embodiment, in order to provide redundancy, one or more additional sensors 112 may be provided. For example, an additional sensor 112 may be mounted in a diametrically opposite relationship relative to the position markers 102, which illustratively extend away from the feedback ring 104 and towards the sensor(s) 112. In yet another embodiment, several position markers 102 may be spaced equiangularly about the perimeter of the feedback ring 104. Other embodiments may apply.

A controller 115 including a detection unit 116 is illustratively electrically connected to the sensor(s) 112 and configured to receive output signal(s) therefrom, the output signal(s) generated upon the sensor(s) 112 detecting the passage of a given position marker 102 adjacent thereto, as will be discussed further below. Controller 115 is configured to provide, on the basis of the signal(s) received from the sensor(s) 112, a blade angle position feedback for the propeller (reference 30 in FIG. 5A), as will be discussed further below. For this purpose, as depicted in FIG. 4, the controller 115 may comprise one or more a processors 121 (e.g. a microprocessor), a memory 123, a non-volatile storage 125, and one or more input-output (I/O) interfaces 127. I/O interfaces 127 may interconnect with detection unit 116 for receiving data and may also interconnect with instrumentation of the aircraft, e.g. dials or displays in the cockpit. The detection unit 116 may further determine from the received output signal(s) the rotational speed of the propeller 30 as well as achieve propeller blade synchrophasing and propeller speed synchronization. Other applications will be readily understood by a person skilled in the art.

Figure 6A:
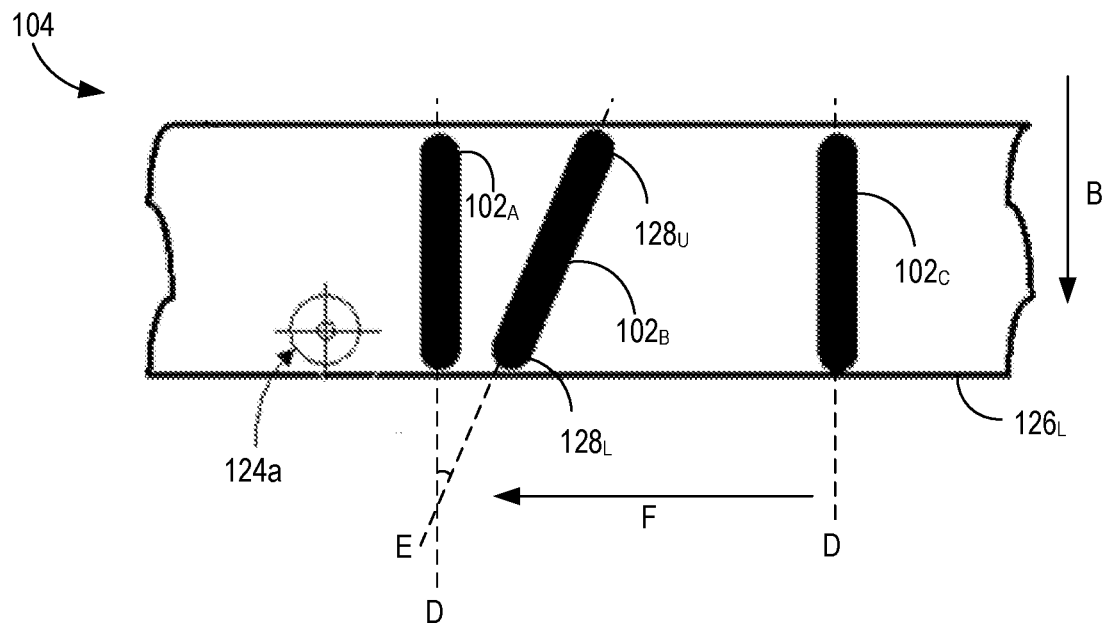
FIGS. 6A-6B are schematic bottom and side views, respectively of the feedback ring of FIG. 2.
Figure 6B:
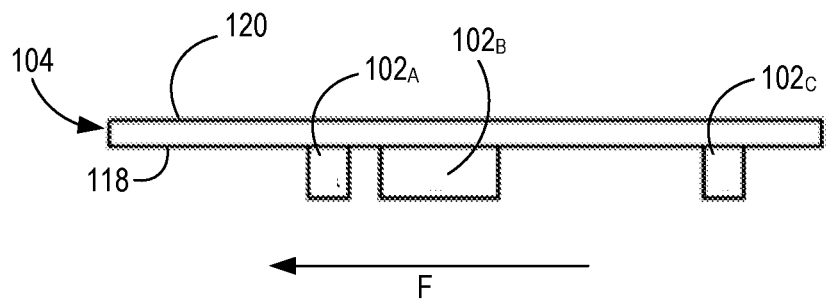

FIG. 6A is a schematic view of the toothed face 118 of feedback ring 104 (in the embodiment of FIG. 3, the inner face). FIG. 6B is a schematic front view of a portion of feedback ring 104. As shown in FIGS. 6A-6B, in one embodiment, the position markers 102 comprise a plurality of spaced protrusions or teeth mounted (using any suitable attachment means, such as screws, bolts, and the like) to inner face 118 of the feedback ring 104 or integrally formed with the feedback ring 104. A first set of teeth, illustratively at least two first teeth 102A and 102C, and at least one second tooth, which is referred to herein as a detection tooth 102B, are provided, with the detection tooth 102B being positioned between two consecutive ones of the first teeth 102A and 102C. In one embodiment, a total of three (3) teeth 102A, 102B, 102C, is provided about the perimeter of the feedback ring 104, as illustrated. It should however be understood that more than three (3) teeth may be provided. In particular, more than one detection tooth as in 102B may be provided for propeller phase detection (e.g. to implement missing tooth detection, as discussed further below) and to maintain operation of the system. The number of teeth in turn drives the size of the digital counters provided in the detection unit (as discussed further below).

Each first tooth 102A or 102C is illustratively positioned along a direction D, which is substantially parallel to the axis A. The detection tooth 102B is positioned along a direction E angled to the direction D, such that the tooth 102B is offset relative to the teeth 102A and 102C. A range of angles may be used to design the detection tooth 102B. The angle between directions E and D may be selected based on optimization of development test data and may include compound angles, e.g. angles comprising a first component providing a radial component and a second component providing a tangential component. Illustratively, the angle between directions E and D is between 0.1 and 89.9 degrees. In one preferred embodiment, the angle is set to 45 degrees so as to maximize the signal change (as detected by the sensor 112 in FIG. 2) for a given axial movement of the propeller (reference 30 in FIG. 5A) resulting from the offset of tooth 102B relative to teeth 102A and 102C.

Figure 7A:
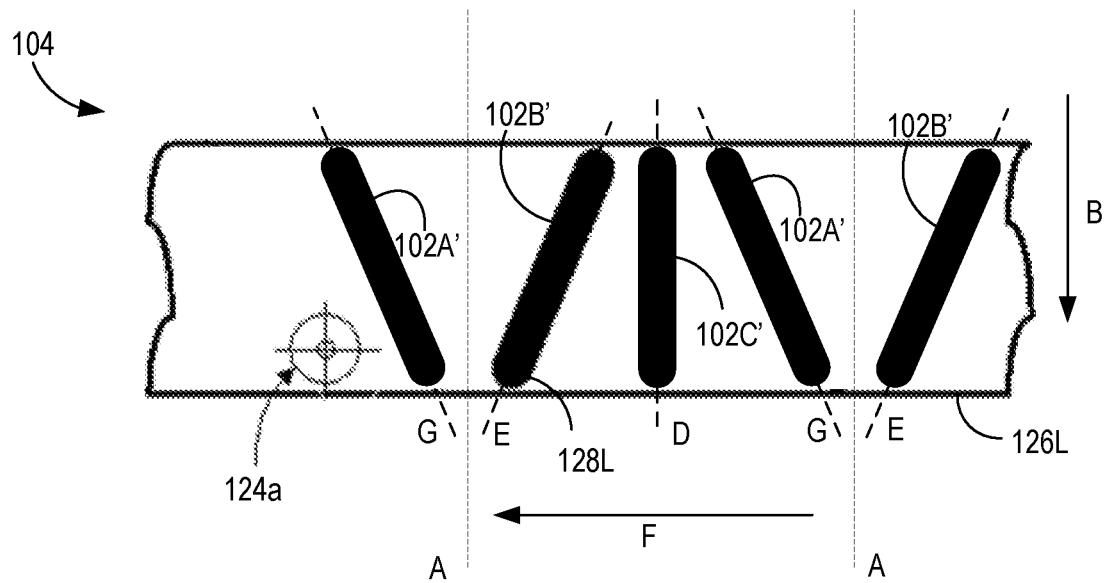
FIGS. 7A-7B are schematic bottom and side views, respectively of another feedback ring.
Figure 7B:
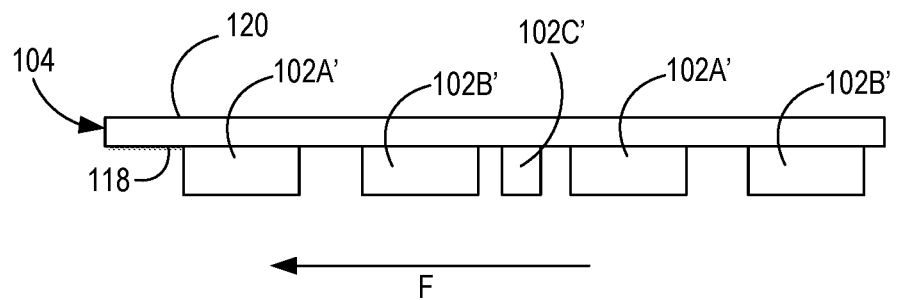

In some embodiments, teeth 102 may be provided in pairs. For example, FIGS. 7A-7B depict an example feedback ring 104 with a plurality of pairs of teeth 102A', 102B'. Each pair of teeth 102A', 102B' are angled relative to one another and to longitudinal axis A so as to diverge from one another and from axis A. As shown, teeth 102A', 102B' diverge in a rearward direction and converge in a forward direction. However, in other embodiments, this orientation may be reversed. Teeth 102A', 102B' may be angled to longitudinal axis A by the same angle, or by different angles. In an example, each of teeth 102A', 102B' is positioned approximately at a 45 degree to longitudinal axis A and teeth 102A', 102B' are positioned approximately at a 90 degree angle to each other.

Pairs of teeth 102A', 102B' are spaced at even intervals around the circumference of feedback ring 104. One or more discontinuities may be provided in the spacing pattern. For example, as shown in FIG. 7A, an extra tooth 102C' may be placed between a pair of teeth 102A', 102B'. In some embodiments, extra teeth 102C' may be provided between multiple pairs of teeth 102A', 102B', provided that a discontinuity exists in the pattern of tooth spacing around the circumference of feedback ring 104.

Figure 8A:
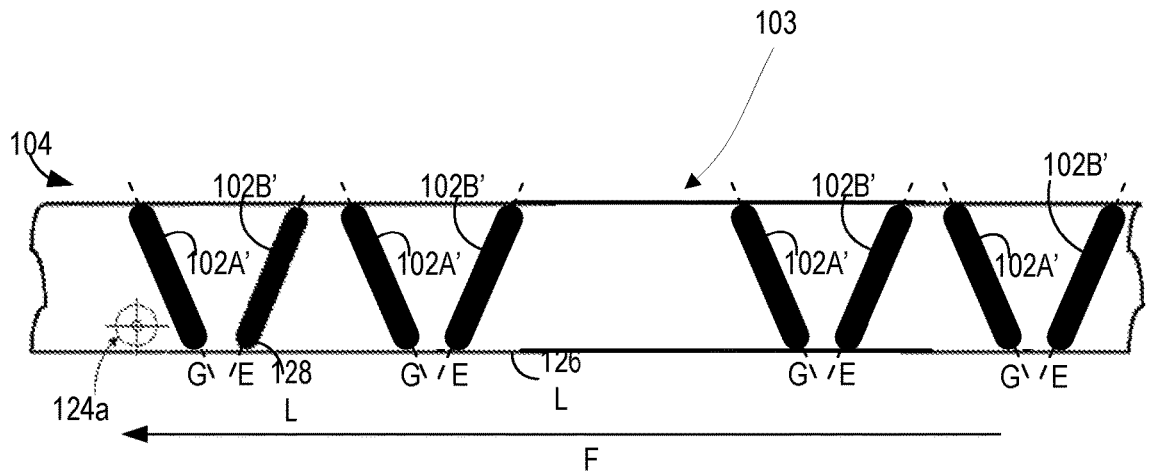
FIGS. 8A-8B are schematic bottom and side views, respectively of another feedback ring.
Figure 8B:
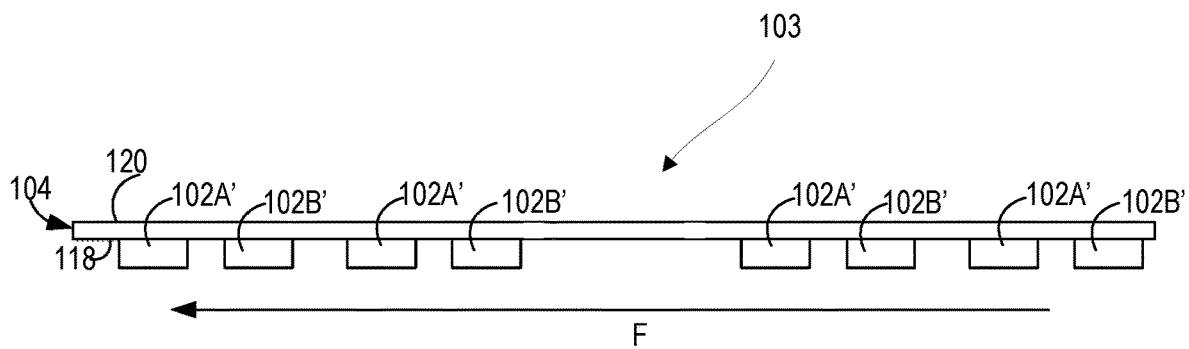

In some embodiments, a discontinuity may be provided in the form of a missing tooth or pair of teeth. For example, FIGS. 8A-8B depict a feedback ring 104 with diverging pairs of teeth 102A', 102B'. The pairs of teeth 102A', 102B' are evenly spaced, but a discontinuity is provided in the form of a gap 103 between pairs of teeth. Other embodiments may apply.

As illustrated in FIG. 3, each sensor 112 may be mounted to the flange 114 adjacent the inner face 118 of the feedback ring 104, i.e. inside the feedback ring 104. In an alternate embodiment, the teeth 102A, 102B, 102C may be mounted to (e.g. extend away from) an outer face 120 of the beta feedback ring 104 and each sensor 112 may accordingly be positioned adjacent the outer face 120, about a perimeter of the feedback ring 104. In yet another embodiment, the position markers may comprise slots (not shown) rather than teeth, with the slots being machined or otherwise formed in the feedback ring 104 and made of a magnetically conductive material, e.g. a ferrous metal. It should be understood that the number of position markers 102A, 102B, 102C of the beta feedback ring 104 may be adjusted according to the desired application. For instance, the number of position markers 102A, 102B, 102C may be increased to provide low speed detection frequency for controller 115.

Figure 9:
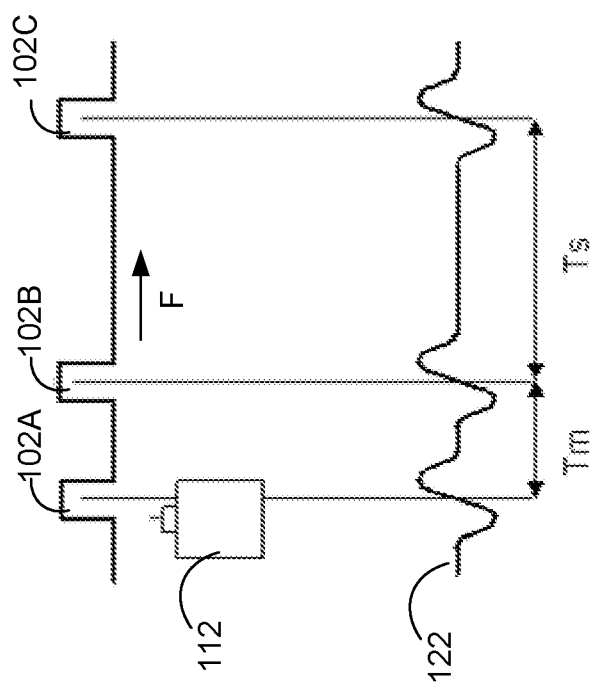
FIG. 9 is a schematic diagram illustrating operation of a beta position transducer.

Referring now to FIGS. 6A-6B and 9, in operation, the feedback ring 104 rotates (e.g. in the direction of arrow F) during rotation of the propeller (reference 30 in FIG. 5A). The sensor 112 then detects the passage of each one of the position markers 102A, 102B, 102C and accordingly generates an output voltage signal (also referred to herein as a variable mark/space signal), illustrated by waveform 122 in FIG. 8. In particular, as the position markers 102A, 102B, 102C are displaced by movement of the propeller 30, each one of the position markers (e.g. position marker 102A) approaches the sensor 112. This changes the sensor's reluctance and causes a magnetic field to be generated and current to flow in the sensor's coil. An increase in the sensor's output voltage signal 122 (e.g. a single pulse causing a positive voltage transition) is then produced. When the given position marker (e.g. position marker 102A) moves away from the sensor 112, the pulse shape is inverted and the sensor's output voltage signal 122 is returned to zero.

The sensor's output voltage signal 122 is received at the detection unit 116, which continuously monitors the signal to detect transitions of the voltage waveform. When a transition is detected, the detection unit 116 accordingly determines that the increase in voltage corresponds to detection by the sensor 112 of passage of a position marker (e.g. position marker 102A). A digital counter (not shown), such as a free-running 20 MHz counter, provided in the detection unit 116 starts counting the number of digital clock cycles until the next position marker (e.g. position marker 102B) is detected by the sensor 112, i.e. until the next transition in the output voltage 122. In particular, the counter determines the number of clock cycles between detection of passage of the first teeth 102A, 102C and detection of passage of the detection tooth 102B of the modified beta feedback ring 104. The interval of time between the passage of the first tooth 102A and the passage of the detection tooth 102B is indicated as Tm while the interval of time between the passage of the detection tooth 102B and the passage of the first tooth 102C is indicated as Ts. The detected time intervals Tm and Ts are then stored in the memory for subsequent processing by the detection unit 116. As discussed above, the number of teeth 102A, 102B, 102C limits the size and/or number of counters within the detection unit 116. In some embodiments, the size and/or number of the digital counters may be increased to provide low speed detection frequency for the EEC, assuming a fixed digital timebase within the detection unit 116. It should be understood that slowing the fixed digital timebase may also achieve low speed detection frequency but penalizes system accuracy. As shown, detection unit 116 detects positive transitions, each of which occurs on the approach of a tooth. However, in other embodiments, depending on the wiring and polarization of sensor 112, the approach of a tooth may cause a negative transition and detection unit 116 may detect such transitions.

Figure 10:
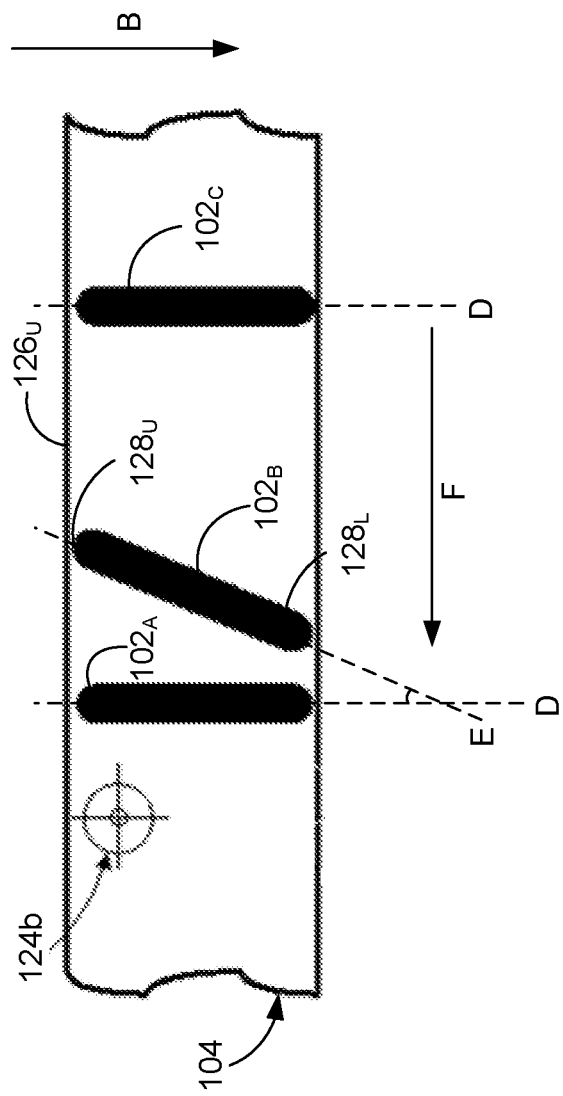
FIG. 10 illustrates the arrangement of FIG. 4 with the propeller in a fully reverse position.

Referring now to FIG. 10 in addition to FIGS. 6A-6B, the angled or offset positioning of the detection tooth 102B results in the sensor 112 seeing different portions of the detection tooth 102B as the propeller mode of operation is modified and the blade angle is varied. Indeed, in one embodiment, the propeller 30 is a reversing (or reverse-pitch) propeller which may be operated in beta mode for ground reversing or taxis operation. As a result, the propeller blades (reference 110 in FIG. 3) may be moved toward reverse pitch, as discussed above, and a negative blade angle can be allowed to produce a reducing or negative thrust in the aircraft. As the blade angle decreases, the feedback ring 104 is moved longitudinally forward (in the direction of arrow B in FIG. 3) at the low blade angle setting by operation of actuator 109 and rods 106. Forward movement continues until reaching reverse pitch stop. At blade angles higher than the low blade angle setting, the feedback ring 104 remains stationary.

During longitudinal displacement of the feedback ring 104, the sensor 112 is successively exposed to different sections of the position markers 102, the different sections being taken along the direction E. As illustrated in FIG. 10, the sensor 112 is in a first position 124B relative to the feedback ring 104 prior to the propeller entering the reverse mode of operation (e.g. before the feedback ring 104 begins axial movement). In this position 124B, the sensor 112 is adjacent an upper edge 126U of the feedback ring 104 is exposed to and can accordingly detect the passage of the upper end portion 128U of the angled tooth 102B. As the propeller 30 enters the beta mode of operation and the blade angle is decreased, the feedback ring 104 is gradually displaced along longitudinal axis A in the direction of arrow B. When the propeller is in the full reverse condition, the feedback ring 104 has been fully axially displaced and reaches the position illustrated in solid lines in FIG. 11 (with the original position of the feedback ring 104 being shown in dashed lines). As a result, the sensor 112 is in a second position 124A relative to the displaced feedback ring 104. In this position 124b, the sensor 112 is adjacent to a lower edge 126L of the feedback ring 104 such that the sensor 112 is exposed to and can accordingly detect the passage of the upper end portion 128U of the angled tooth 102B.

Figure 11:
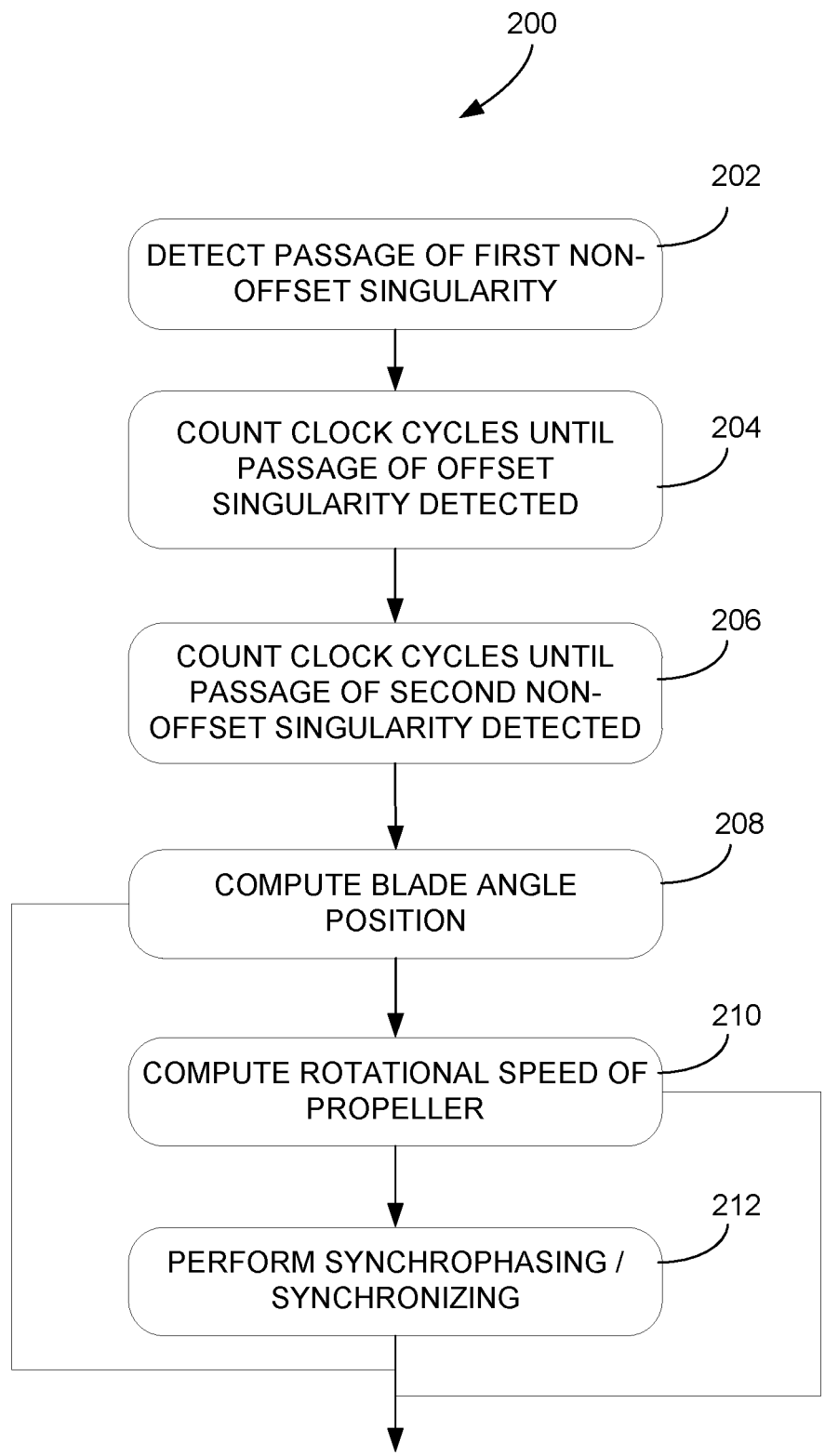
FIG. 11 is a flowchart of a method for electronic beta feedback detection.

As can be seen from FIG. 10 and FIG. 11, the circumferential distance between tooth 102A and tooth 102B (i.e. the distance measured along a circumferential line of ring 204) decreases in direction B due to the angled configuration of the tooth 102B. That is, teeth 102A, 102B may converge in direction B such that the lower end portion 128L is positioned closer to tooth 102A (measured in the direction of rotation illustrated by arrow F) than the upper end portion 128U. As such, when the feedback ring 104 is in the initial position with the sensor 112 in position 124B relative to the feedback ring 104, the sensor 112 detects the passing of the tooth 102B (e.g. the upper end 128L) earlier (i.e. in less time) than when the feedback ring 104 is fully displaced with the sensor 112 in position 124a relative to the feedback ring 104 and the sensor 112 detects the passing of the tooth 102B (e.g. the upper end 128U thereof). As a result, the time taken by the sensor 112 to detect the passing of the tooth 102B varies as the feedback ring 104 is displaced axially in the direction of arrow B. Still, since the teeth 102A, 102C are not angled but all extend along the direction E, as the feedback ring 104 moves, the sensor 112 detects passing of each one of the teeth 102A, 102C at the same time, regardless of whether the sensor is in position 124a or position 124b.

Therefore, as can be seen in FIG. 9, the timeframes Tm and Ts are varied as the feedback ring 104 moves axially along the propeller system and the position of the sensor 112 relative to the feedback ring 104 varies. In particular and as discussed above, as feedback ring 104 moves longitudinally in direction B (FIG. 10), the section or area of the tooth 102B observed by the sensor 112 is gradually displaced along the direction E of FIG. 6A, 7A, 8A and more rearward (relative to direction of arrow B) tooth sections are observed until the most rearward section, e.g. the upper end 128U, is detected. Accordingly, the area of the tooth 102B observed by the sensor 112 is gradually moved rearward, i.e. from the lower (and most forward) end 128L being detected at first to the upper (and most rearward) end 128U being detected at last, and tooth sections in between being successively detected by the sensor 112. Therefore, the time interval Tm is increased and the time interval Ts decreased. This in turn alters the spacing relationship between Tm (timeframe between detection by sensor 112 of teeth 102A and 102B) and Ts (timeframe between detection by sensor 112 of teeth 102B and 102C).

The relationship between the beta (blade angle) position and the measured values of Tm and Ts is then given by:

$$\text{Beta angle} = \text{function (feedback ring position)} = \text{function } [(Ts-Tm)/(Ts+Tm)] \quad (1)$$

The expression (Ts−Tm)/(Ts+Tm) is also referred to as the mark-to-space ratio. The mark-to-space ratio is related to the feedback ring position by a function that is a characteristic of the ring and tooth geometry. The longitudinal position of the feedback ring is related to the propeller beta angle by a function specific to the propeller 30.

The detection unit 116 can then apply equation (1) to compute the longitudinal position of the feedback ring 104 and the corresponding blade angle position for the propeller (reference 30 in FIG. 5A) and accordingly the axial position of the propeller system. The detection unit 116 can further detect axial movement of the feedback ring 104 by detecting a change in the spatial relationship between Ts and Tm. This could be done by comparing current values of Ts and Tm to previous values stored in memory and detecting the change in spatial relationship upon detecting a difference in the values.

In addition to beta position, the detection unit 116 can electronically decode the sensor's output voltage signal to determine the propeller's rotational speed. Indeed, the rotational speed can be computed on the basis of the sum of the timeframe values (Tm+Ts) and the number of position markers 102A, 102B, 102C, using known computation methods. Propeller synchrophasing and synchronization for multi-engine (e.g. twin engine) aircrafts and other applications may further be implemented by removing one or more of the position markers 102A, 102B, 102C from the beta feedback ring 104 to permit missing tooth pulse detection capability in the engine control electronics. It should be understood that either one of the position markers 102, i.e. one of the first teeth 102A, 102B or one angled teeth 102B, may be removed from the feedback ring 104 to perform missing tooth detection. In particular, the angled tooth 102B may be removed such that a gap is created between successive first teeth 102A. Detection of the missing tooth may then provide a periodic (e.g., once per revolution) timing position signal. When several engines are provided in the aircraft, the timing position signal can then be used to keep the engines operating at the same revolutions per minute (RPM) and the propeller blades in phase with one another. As a result of such synchrophasing and synchronizing, noise and vibration can be reduced.

FIG. 11 illustrates a method 200 for electronic beta feedback. The method 200 comprises detecting the passage of a first non-offset position marker at step 202. The next step 204 is then to count the clock cycles until the passage of an offset position marker is detected. The clock cycles until detection of the passage of a second non-offset position marker may then be counted at step 206. Detection may be performed using a suitable sensor, such as a sensor 112 arranged on a beta feedback ring as discussed herein above with reference to FIG. 2, with the non-offset and offset position markers arranged as discussed herein above with reference to FIG. 4. The next step 208 may then be to compute the blade angle position on the basis of the counted clock cycles, e.g. by applying equation (1) discussed herein above. As discussed above, the rotation speed of the propeller may also be computed at step 210 using knowledge of the counted clock cycles and the number of position markers and propeller synchrophasing and synchronization may also be performed at step 212 by applying missing tooth detection.

As noted, sensor 112 is mounted to a flange 114 on housing 48 of reduction gearbox 26 (FIG. 2). Thus, the longitudinal position of sensor 112 is fixed relative to reduction gearbox 26. Conversely, feedback ring 104 is mounted for rotation with propeller 130 and its longitudinal location is dependent on the longitudinal location of propeller 130. That is, actuators 109, and rods 106 (FIG. 4) cooperate to fix the longitudinal location of feedback ring 104 relative to that of propeller 130.

Accordingly, the relative longitudinal position of feedback ring 104 and sensor 112 depends on that of propeller 130 and reduction gear box 126. Design specifications may define known nominal positions of propeller 130 and reduction gear box 126, and thus, of feedback ring 104 and sensor 112. However, the actual relative positions of components may vary from their respective nominal design values. For example, variance may exist due to dimensional tolerances of components (the cumulative effect of which may be referred to as tolerance stack-up), variance in assembly, part wear or failure, or other factors.

As described above, the beta angle of propeller blades 110 is measured based on the relative longitudinal positions of feedback ring 104 and sensor 112. Accurate control of beta angle during flight or ground operation may be crucial for safe and efficient operation. Moreover, operation of propeller assembly 136 within design specifications may likewise be crucial for safe and efficient operation.

Controller 115 may further be configured to monitor other operating conditions. For example, controller 115 may monitor relative longitudinal positions of feedback ring 104 and sensor 112 to verify that tolerances are within specifications, and to trim or calibrate beta angle measurement.

During engine startup, propeller 30 may be idled, during which the beta angle of blades 110 may default to a feather condition, namely, maximum beta angle. In this condition, actuator 109 does not bias rods 106 rearwardly (FIG. 5C). Thus, in the feather condition, feedback ring 104 is in its maximally-forward position. Reduction of the beta angle would result in feedback ring 104 progressively being urged in the rearward direction.

While propeller 30 is idled with blades 110 in feather condition, feedback ring 104 turns along with propeller 30 and sensor 112 detects passage of teeth 102. Detection unit 116 measures the interval Tm between passage of teeth 102A, 102B. As described above with reference to FIGS. 6A and 10, at a given rotational speed of propeller 30, the duration Tm corresponds to a circumferential distance between teeth 102A, 102B, where they pass over or under sensor 112. The measured circumferential distance is in turn associated with a specific longitudinal position of feedback ring 104 relative to sensor 112. For simplicity, tolerance verification and beta-feedback calibration are described herein with reference to measurements of longitudinal position, based on the observed distance between position markers. However, as will be apparent, calculations may instead be performed directly based on measured circumferential distances, without conversion to corresponding longitudinal positions.

Since propeller 30 is known to be in its feather condition in which actuators 109 do not bias feedback ring 104 rearwardly, feedback ring 104 is known to be in its maximally-forward position. Thus, a particular relative longitudinal position, and a corresponding circumferential distance between position markers may be expected based on design specifications and the measured position should be within a specified tolerance depending on geometry and environmental conditions present during engine start up. However, the actual longitudinal position, and thus, the measured circumferential distance between markers, may differ from the expected position, due to dimensional tolerances, assembly variability, part wear or failure, or the like.

For example, feedback ring 104 may be expected, based on design specifications, to be positioned as indicated in FIG. 10. However, feedback ring 104 may in fact be located forward of its expected position. In the expected position, teeth 102A, 102B would pass sensor 112 proximate their upper ends 128U, where the circumferential distance between teeth 102A, 102B is short. However, in the actual position, teeth 102A, 102B pass sensor 112 closer to their lower ends 128L, where the circumferential distance between 102A and 102B is shorter. Conversely, if the actual position was rearward of the defined position, the time interval Tm between passage of teeth 102A and 102B would be shorter than expected, and the circumferential distance would likewise be shorter.

Controller 115 may be configured to receive a baseline measurement from detection unit 116 at startup and compare the measurement to a reference value for the feather condition. Any difference between the two may result from dimensional variance in components, etc.

Controller 115 may be configured to compare the measured position to a threshold range. For example, the reference feather value may be the measurement that would be obtained at the feather condition if all components had their nominal dimensions and locations, in accordance with design specifications. The upper and lower limits of the threshold range may be measurements associated with the upper and lower tolerance limits of the propeller assembly. A measurement outside the tolerance thresholds may indicate an unsafe operating condition and may be associated with, for example, one or more parts being outside design specifications, a part failure, incorrect assembly, or other conditions. Controller 115 may therefore be configured to output a signal indicative of tolerance status. The signal may, for example, be provided for display on an aircraft instrument.

Controller 115 may store the baseline measurement in non-volatile memory 123 for use as a calibration value. Specifically, the controller may output a signal to an internal or external storage for storing the baseline measurement as a calibration value. Subsequent measurements taken using sensor 112 may be compared to the calibration value to account for dimensional variances, etc., thereby correcting beta angle measurements. Controller 115 may also output a signal for displaying the calibration status on an aircraft instrument.

In addition, on engine startup, controller 115 may further be configured obtain a new measurement in the feather condition and compare it to the previous stored baseline measurement. If the new measurement differs from the previous baseline measurement by more than a threshold value associated with repeatability of the measurement system, a change may have occurred in one or both of the propeller assembly or the measurement assembly. Accordingly, if a new measurement differs from the baseline measurement by more than a repeatability threshold, a warning (e.g. an alarm) may be enunciated and a maintenance procedure may be performed. For example, it may first be determined if maintenance had previously been performed without setting a new baseline value. If so, the deviation from the repeatability threshold may be associated with the previous maintenance. For instance, if a part of the propeller assembly was replaced, the dimensions of the assembly may change slightly, and the measured baseline value may be expected to change. Conversely, if no maintenance had previously been performed without adjusting the baseline value, the deviation from the repeatability tolerance may indicate a change in the propeller or measurement assembly, such as part wear, breakage or deformation. Accordingly, the warning may result in an inspection being performed.

Figure 12A:
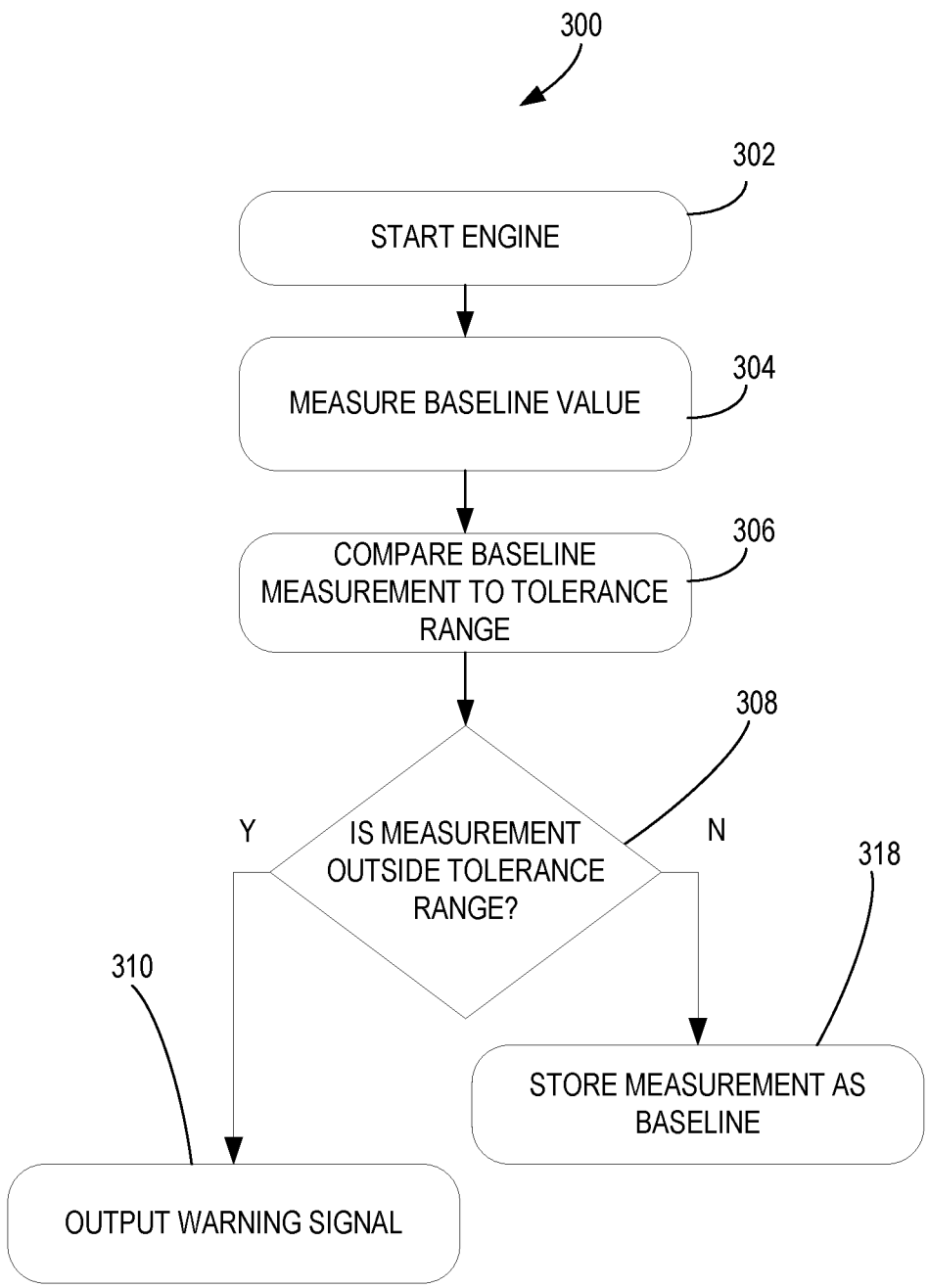
FIG. 12A is a flowchart of a method of tolerance condition monitoring.

FIG. 12A depicts a process 300 of calibrating a propeller control system. At block 302, the aircraft engine is started. During engine starting, blades 110 of propeller 30 are in their feather condition, namely, maximum beta angle.

At block 304, controller 115 obtains a baseline measurement indicative of the longitudinal position of feedback ring 104 relative to sensor 112 based on the circumferential distance between teeth 102A, 102B.

At block 306, controller 115 receives an instruction from an operator to store the baseline measurement as a calibration value in non-volatile memory. The instruction may be input, for example, using a switch or button in the cockpit, a software control or any other suitable input device and method.

At block 308, controller 115 determines if the difference between the measured value and the reference value is greater than a tolerance threshold range. In an example, the tolerance threshold is +/−50 thousandths of an inch from nominal. If so, at block 310, controller 115 outputs a warning signal for display on an aircraft instrument. The warning signal may, for example, be a prompt for maintenance to be performed and a "no dispatch" indication that the aircraft should not be flown. Alternatively, if the measured value is within the threshold, at block 318, the measured value is stored in non-volatile memory. The ring position baseline value stored in non-volatile memory may subsequently be used in beta angle control functions of the aircraft. Such functions may include beta limiting (minimum blade angle limiting) and governing in reverse. Specifically, subsequent measurements may be compared to the baseline value to determine the beta angle.

Figure 12B:
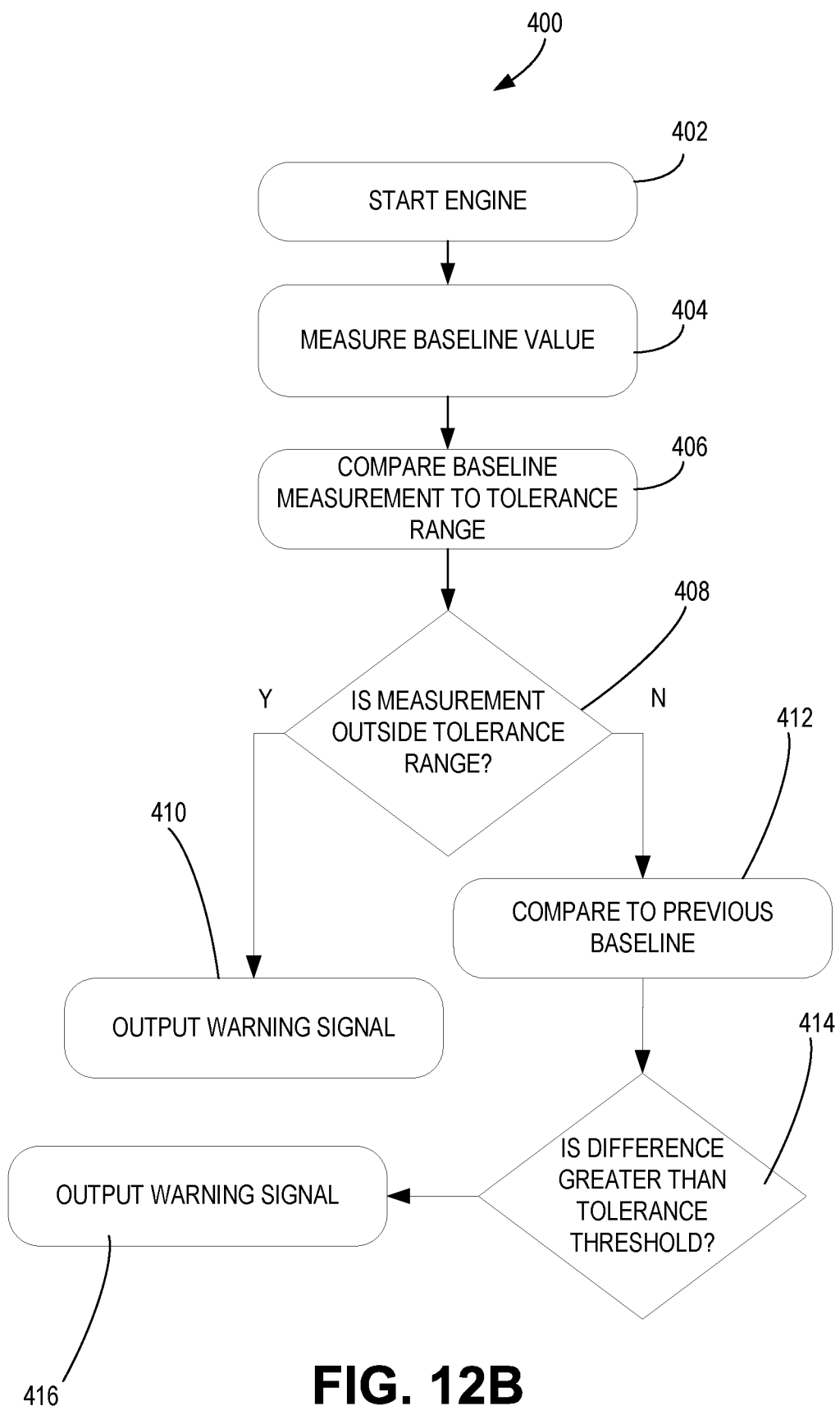
FIG. 12B is a flowchart of a method of beta feedback calibration.

FIG. 12B depicts a process 400 of checking the propeller assembly. At block 302, the aircraft engine is started. During engine starting, blades 110 of propeller 30 are in their feather condition, namely, maximum beta angle.

At block 404, controller 115 obtains a baseline measurement indicative of the longitudinal position of feedback ring 104 relative to sensor 112 based on the circumferential distance between teeth 102A, 102B.

At block 406, controller 115 compares the baseline measurement to a reference threshold range for the feather condition.

At block 408, controller 115 determines if the difference between the measured value and the refer value is greater than a tolerance threshold range. In an example, the tolerance threshold is +/−50 thousandths of an inch from nominal. If so, at block 410, controller 115 outputs a warning signal for display on an aircraft instrument. The warning signal may, for example, be a prompt for maintenance to be performed and a "no dispatch" indication that the aircraft should not be flown. Alternatively, if the measured value is within the threshold, at block 412, the measured value is compared to the previous baseline, if any. At block 414, controller 115 determines if the new measured value differs from the previous baseline by more than a repeatability threshold. The repeatability threshold may be an intermediate range within the tolerance threshold range. In an example, the repeatability threshold is +/−10 thousandths of an inch. The measured value may differ from the previous baseline by more than the repeatability threshold if, for example, a maintenance procedure is performed, such as replacement of a component, or if a failure occurs. At block 416, a warning may be enunciated to perform a maintenance procedure. The warning produced at block 416 may differ from those produced at block 410 and at block 310 of FIG. 12A. The maintenance procedure may include determining whether the measurement system should be re-calibrated based on previous maintenance and performing an inspection.

Process 300 may be initiated automatically based, e.g. on a timer or trigger condition at controller 115. Alternatively, process 300 may be initiated by operation of a control input, e.g. by a pilot or technician.

Process 400 may be initiated by operation of a control input, e.g., by a pilot or technician. Process 400 may be repeated at least following assembly of an engine or propeller assembly, or after servicing such as replacement of a part. Process 400 may further be repeated periodically and automatically, e.g. on each startup. This may allow for verification that the propeller assembly is within design specifications. Moreover, accuracy of beta angle measurement may be maintained. For example, if a part is replaced, dimensions of the propeller assembly and the relative locations of feedback ring 104 and sensor 112 may change, yet remain within tolerance specifications. Nevertheless, controller 115 may be recalibrated to correct for the changed dimensions.

As described above, tolerance monitoring and calibration of the beta angle feedback system is performed based on expected values in the feather condition of propeller 30. Alternatively, the above-described process may be performed based on obtaining measurements at another known blade angle and comparing those measurements to reference values associated with that blade angle. For example, measurements may be obtained with the aircraft propeller blades in a maximum thrust condition, with a small positive beta angle. In such a condition, the feedback ring 104 is known to be in its maximally-forward position. The above description is meant to be exemplary only, and one skilled in the art will recognize that changes may be made to the embodiments described without departing from the scope of the invention disclosed. For example, the annular member may be stationary and the sensor may rotate. In another example, the sensor and annular member may be operative in connection with another suitable rotating component of the engine indicative of propeller rotation. Relative axial movement between sensor(s) and the annular member may be accomplished in any suitable fashion. Still other modifications which fall within the scope of the present invention will be apparent to those skilled in the art, in light of a review of this disclosure, and such modifications are intended to fall within the appended claims.

What is claimed is:

1. A propeller control system for an aircraft propeller rotatable about a longitudinal axis and having an adjustable blade angle, the propeller control system comprising:
    a blade angle feedback ring coupled to the propeller to rotate with the propeller and to move along the longitudinal axis with adjustment of the blade angle, the blade angle feedback ring including a plurality of position markers spaced around a circumference of the blade angle feedback ring such that a circumferential distance between at least some adjacent ones of the position markers varies along the longitudinal axis;
    a sensor positioned adjacent the blade angle feedback ring for producing sensor signals indicative of passage of the position markers as the blade angle feedback ring rotates, such that an interval between ones of the sensor signals is indicative of the circumferential distance between adjacent ones of the position markers; and
    a controller in communication with the sensor and configured to output an output signal indicative of a longitudinal position of the blade angle feedback ring based on the sensor signals indicative of passage of the position markers, the output signal including:
        a first warning signal when the longitudinal position is outside a threshold range; and
        a second warning signal when the longitudinal position is: outside an intermediate range within the threshold range; and within the threshold range,
    wherein the threshold range corresponds to a dimensional tolerance of a propeller assembly and the intermediate range corresponds to measurement repeatability of the sensor.

2. The propeller control system of claim 1, wherein a longitudinal position of one of the blade angle feedback ring and the sensor is fixed relative to the propeller, and a longitudinal position of the other of the blade angle feedback ring and the sensor is fixed relative to a gearbox housing.

3. The propeller control system of claim 1, wherein the controller is configured to store a calibration value indicative of the longitudinal position if the longitudinal position is within the threshold range, and to continuously measure intervals between consecutive ones of the sensor signals, and to provide an output indicative of the blade angle, based on the intervals and the calibration value.

4. The propeller control system of claim 1, wherein the position markers include ferrous teeth on the blade angle feedback ring and the sensor includes a hall effect sensor.

5. The propeller control system of claim 1, wherein the controller is configured to measure the longitudinal position while the propeller is in a feather condition.

6. The propeller control system of claim 1, wherein the controller is configured to measure the longitudinal position while the propeller is in a maximum thrust condition.

7. The propeller control system of claim 6, wherein the controller is configured to measure the longitudinal position at engine startup.

8. A method of monitoring an operating condition of an aircraft propeller rotatable about a longitudinal axis and having an adjustable blade angle, the method comprising:
    rotating a blade angle feedback ring mounted for rotation with the propeller;
    moving the blade angle feedback ring along the longitudinal axis in correspondence with adjustment of the blade angle of the propeller;

when the blade angle feedback ring is rotating, obtaining, from a sensor, a measurement of a circumferential distance between position markers on the blade angle feedback ring, the position markers spaced around a circumference of the blade angle feedback ring such that the distance between at least some adjacent ones of the position markers varies along the longitudinal axis, the distance between the position markers being representative of a longitudinal position of the blade angle feedback ring; and outputting an output signal representative of the longitudinal position of the blade angle feedback ring based on the distance between the position markers, the output signal including:
   a first warning signal when the longitudinal position is outside a threshold range; and
   a second warning signal when the longitudinal position is: outside an intermediate range within the threshold range; and within the threshold range, wherein the threshold range corresponds to a dimensional tolerance of a propeller assembly and the intermediate range corresponds to measurement repeatability of the sensor.

9. The method of claim 8, wherein outputting the output signal is performed in response to determining that the longitudinal position is outside the threshold range and for display on aircraft instrumentation.

10. The method of claim 8, comprising measuring the distance between markers while the propeller is in a feather condition.

11. The method of claim 8, comprising measuring the distance between markers while the propeller is in a maximum thrust condition.

12. The method of claim 8, comprising storing a calibration value from the measurement at engine startup and continuously measuring a longitudinal position of the blade angle feedback ring based on the distance between the position markers and the calibration value, and outputting a signal indicative of the blade angle based on the measuring.

13. The method of claim 8, wherein the measuring includes producing a voltage by a Hall effect sensor in response to passing of a position marker.

14. An aircraft engine comprising:
   a propeller rotatable about a longitudinal axis, the propeller having blades with an adjustable blade angle;
   a feedback ring mounted for rotation with the propeller, and for movement along the longitudinal axis corresponding to adjustment of the blade angle, the feedback ring including a plurality of position markers spaced around its circumference such that a circumferential distance between at least some adjacent ones of the position markers varies along the longitudinal axis;
   a propeller shaft extending from a gearbox for driving the propeller;
   a sensor fixedly mounted to the gearbox, the sensor operable to produce a sensor signal when passed by a position marker as the feedback ring rotates, such that an interval between ones of the sensor signals is indicative of the circumferential distance between adjacent ones of the position markers; and
   a controller in communication with the sensor and configured to output an output signal representative of a longitudinal position of the feedback ring based on the sensor signals, the output signal including:
     a first warning signal when the longitudinal position is outside a threshold range; and a second warning signal when the longitudinal position is: outside an intermediate range within the threshold range; and within the threshold range,
   wherein the threshold range is associated with a tolerance range and the intermediate range is associated with a measurement repeatability.

15. The aircraft engine of claim 14, wherein the controller is configured to measure the interval while the propeller is in a feather condition.

16. The aircraft engine of claim 15, wherein the controller is configured to measure the longitudinal position at engine startup.

* * * * *